UNITED STATES PATENT OFFICE.

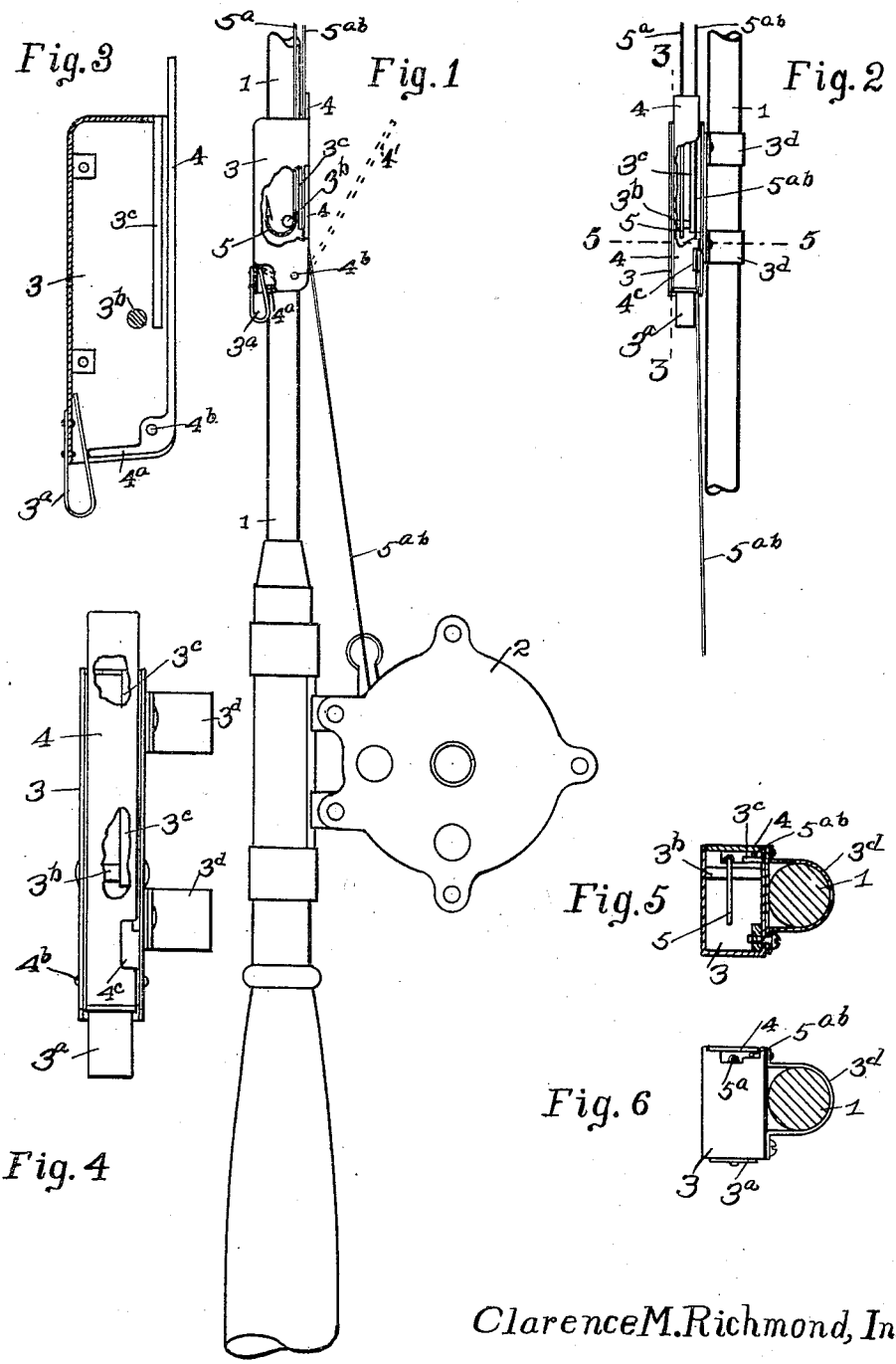

CLARENCE M. RICHMOND, OF BELLINGHAM, WASHINGTON.

FISH-HOOK RETAINER.

1,269,743. Specification of Letters Patent. Patented June 18, 1918.

Application filed February 25, 1918. Serial No. 219,070.

*To all whom it may concern:*

Be it known that I, CLARENCE M. RICHMOND, a citizen of the United States, residing at Bellingham, in the county of Whatcom and State of Washington, have invented a new and useful Fish-Hook Retainer, of which the following is a specification.

My invention relates to improvements in fish-hook retainers, and the objects of my invention are: to provide means for retaining fish hooks, when attached to line and pole, which prevent injury both to and by said hooks; and to clamp the inner portion of the line close to the pole.

I accomplish these objects with the mechanism illustrated in the accompanying drawing in which Figure 1 is a side elevation of a fully equipped fish pole to which my fish-hook retainer is fastened, Fig. 2 is a plan view of Fig. 1. Fig. 3 is a side elevation of my retainer in section on the line 3—3 of Fig. 2, drawn on a larger scale, Fig. 4 is a plan view of Fig. 3, Fig. 5 is a rear-end elevation of Fig. 2, in section on the line 5—5 of Fig. 2, drawn on a larger scale, and Fig. 6 is a front-end elevation of Fig. 2 drawn on a larger scale.

Similar characters refer to similar parts throughout. Certain parts are broken away in order to show others hidden thereby.

In the drawing, 1 is a fish pole. 2 is a reel attached to said pole. 3 is the box-like structure of my retainer. $3^a$ is a spring to bear on the lid of said box to retain it in closed position. $3^b$ is a pin in box 3 with which the hook may be engaged. $3^c$ is an interior shelf fastened to the inner side of box 3, extending from the forward end of said box to a point over pin $3^b$ and occupying a portion only of the width of said box. $3^d$ is a band clamp fastened to box 3 with which said box is attached to pole 1. 4 is the lid of box 3. Said lid projects beyond the front end of the box, is pivoted at $4^b$ near the rear end of said box, and has the angular extension $4^a$ closing the rear end of box 3 and bearing on spring $3^a$. $4^c$ is a notch on the inner side of lid 4, through which the line may pass. 5 is a fish hook attached to snell $5^a$. $5^{ab}$ is the inner end of the line attached to reel 2 and snell $5^a$.

In operation: Lid 4 is raised to its dotted position at $4'$, hook 5, with fly or bait in place if desired, is placed in box 3, in the opening between shelf $3^c$ and the outer side of box 3, and engaged with pin $3^b$. The slack in line $5^{ab}$ is taken up by reel 2, line $5^{ab}$ is placed in notch $4^c$ and on shelf $3^c$; then lid 4 is closed clamping line $5^{ab}$ between it and shelf $3^c$ and retaining hook 5 within box 3 while it is held closed by the action of spring $3^a$. To remove the hook, lid 4 is opened to its dotted-line position at $4'$ when both hook 5 and line $5^{ab}$ can be taken from box 3.

Having thus fully disclosed my invention, what I claim as new and desire to secure by Letters Patent is—

1. In a fish-hook retainer, in combination, a closable fish-hook receptacle, means for engaging a hook in said receptacle, means to close said receptacle, and means to clamp a line beneath said closure means.

2. In a fish-hook retainer, in combination, a closable fish-hook-and-line receptacle, means for engaging a hook in said receptacle, a shelf in said receptacle, and a spring-pressed lid pivoted on said receptacle and closable over said shelf.

3. In a fish-hook retainer, in combination, a box, means to attach said box to a fish pole, means within said box engageable with a fish hook, a shelf within said box, a spring-retained, pivoted lid on said box, closable against the top of said shelf, and a notch in one edge of said lid.

CLARENCE M. RICHMOND.

Copies of this patent may be obtained for five cents each, by addressing the "Commissioner of Patents, Washington, D. C."